United States Patent

Lagasse

Patent Number: 4,618,322

Date of Patent: Oct. 21, 1986

[54] REACTION INJECTION MOLDING SYSTEM WITH FINGER GATE

[75] Inventor: Charles A. Lagasse, Newburyport, Mass.

[73] Assignee: PlasTek Corporation, Newburyport, Mass.

[21] Appl. No.: 669,905

[22] Filed: Nov. 8, 1984

Related U.S. Application Data

[63] Continuation-in-part of Ser. No. 507,336, Jun. 24, 1983, abandoned.

[51] Int. Cl.⁴ .............................................. B29C 33/12
[52] U.S. Cl. ................................. 425/129 R; 249/91;
   264/313; 264/328.6; 425/543
[58] Field of Search .................. 425/129 R, 117, 566,
   425/130, 123, 125, 128, 182, 190, 542, 543,
   DIG. 3, DIG. 58, DIG. 227; 264/271.1, 272.16,
   272.17, 313, 316, 328.12, 338, 328.6; 249/155,
   165, 166, 169, 54, 81, 82, 85, 93, 95, 96

[56] References Cited

U.S. PATENT DOCUMENTS

| | | | |
|---|---|---|---|
| 3,759,644 | 9/1973 | Ladney, Jr. | 425/129 R |
| 3,947,199 | 3/1976 | Hecht et al. | 425/129 R |
| 4,123,494 | 10/1978 | Evrard et al. | 264/267 |
| 4,486,368 | 12/1984 | Hancock | 425/117 |

OTHER PUBLICATIONS

Plastics Mold Engineering Handbook, Dubois & Pribble editors, Society of Plastics Engineers, Inc. 1978, pp. 336, 427, 490–492.

*Primary Examiner*—Jay H. Woo
*Assistant Examiner*—J. Fortenberry
*Attorney, Agent, or Firm*—Joseph S. Iandiorio; William E. Noonan

[57] ABSTRACT

A reaction injection molding system including: a core and a permanent cavity at least a portion of which is elastomeric. The elastomeric portion of the cavity has a first part defining at least a portion of the floor of the cavity, a second part defining at least a portion of the wall of the cavity and a third part defining at least a portion of the upper edge of the wall and extending therefrom to define at least a portion of the top of the cavity. A finger gate interconnects the cavity with a source of molding medium; the finger gate includes a plurality of spaced fingers on the core transverse to the edge of the wall and aligned with the flow of the molding medium into the cavity for engaging the third part of the elastomeric portion and securing the elastomeric portion in the cavity.

11 Claims, 5 Drawing Figures

REACTION INJECTION MOLDING SYSTEM WITH FINGER GATE

RELATED CASE

This application is a continuation-in-part of U.S. patent application Ser. No. 507,336, filed June 24, 1983, now abandoned.

FIELD OF INVENTION

This invention relates to a reaction injection molding system, and more particularly to a unique mold form and gate for such a machine.

BACKGROUND OF INVENTION

Conventional techniques for molding parts from plastics are typically unable to provide high-quality, inexpensive specialty finishes such as wood grain and other natural and unique textures. In order to obtain such textures, the steel cavity and core parts of the mold may be engraved or etched by skilled artisans, or false texturing processes may be used; even then the reproduction is never quite the same as the natural texture. These techniques are also not suited for making parts with inserts, such as table tops containing inlay portions, because the insert cannot be effectively sealed and the plastic seeps around the insert, creating a flashing that overlaps the inlaid section or insert. The edges are often not clean and the insert and molded part may be misaligned. Further, the precision nature of the mold cavity and core are ill-suited to receive inserts whose dimensions may vary widely.

SUMMARY OF INVENTION

It is therefore an object of this invention to provide a reaction injection molding system for producing more realistic textures on the molded parts.

It is a further object of this invention to provide such a reaction injection molding system for producing molded parts with inserts.

It is a further object of this invention to provide such a reaction injection molding system for producing molded parts with inserts, in which the resulting composite piece has clean mating edges without flashing and the insert is properly aligned and positioned.

It is a further object of this invention to provide such a reaction injection molding system using a permanent cavity surface which is defined at least in part by an elastomeric portion.

It is a further object of this invention to provide such a reaction injection molding system in which the injection is controlled to prevent disruption of the elastomeric portion.

It is a further object of this invention to provide such a reaction injection molding system in which an insert is securely sealed to the cavity and/or core.

It is a further object of this invention to provide such a reaction injection molding system which easily accommodates for variations in the dimensions of the inserts used.

The invention features a reaction injection molding system including a core and a permanent cavity. At least a portion of the cavity is elastomeric. The elastomeric portion has a first part defining at least a portion of the floor of the cavity, a second part defining at least a portion of the wall of the cavity, and a third part defining at least a portion of the upper edge of the wall and extending outwardly therefrom to define at least a portion of the top of the cavity. A finger gate interconnects the cavity with a source of molding medium. The finger gate includes a plurality of spaced fingers on the core transverse to the edge of the wall and aligned with the flow of the molding medium for engaging the third part of the elastomeric portion and securing that portion in the cavity.

In one embodiment, the first part of the elastomeric portion defines the entire floor of the cavity. In another embodiment, the first part of the elastomeric portion defines only the periphery of the cavity floor and receives an insert at its inner end proximate the interior non-elastomeric portion of the cavity floor. The core may include an insert gasket for sealing against the surface of an insert, if one is used. The core may also include a deflector proximate the finger gate for redirecting the molding medium transmitted through the finger gate. Typically, when used with an insert the deflector directs the incoming molding medium away from the insert gasket.

The cavity may include an undercut proximate the top of the cavity behind the upper edge of the wall for interlocking with the complementarily shaped third part of the elastomeric portion. Vacuum means may be provided for urging an insert in the cavity against the end of the first part of the form and toward the interior, non-elastomeric floor portion of the cavity. An edge gate may be used to provide molding medium to the finger gate. The edge gate may include an injection channel and a dam.

DISCLOSURE OF PREFERRED EMBODIMENT

Other objects, features and advantages will occur from the following description of a preferred embodiment and the accompanying drawings, in which.

Figure 1:
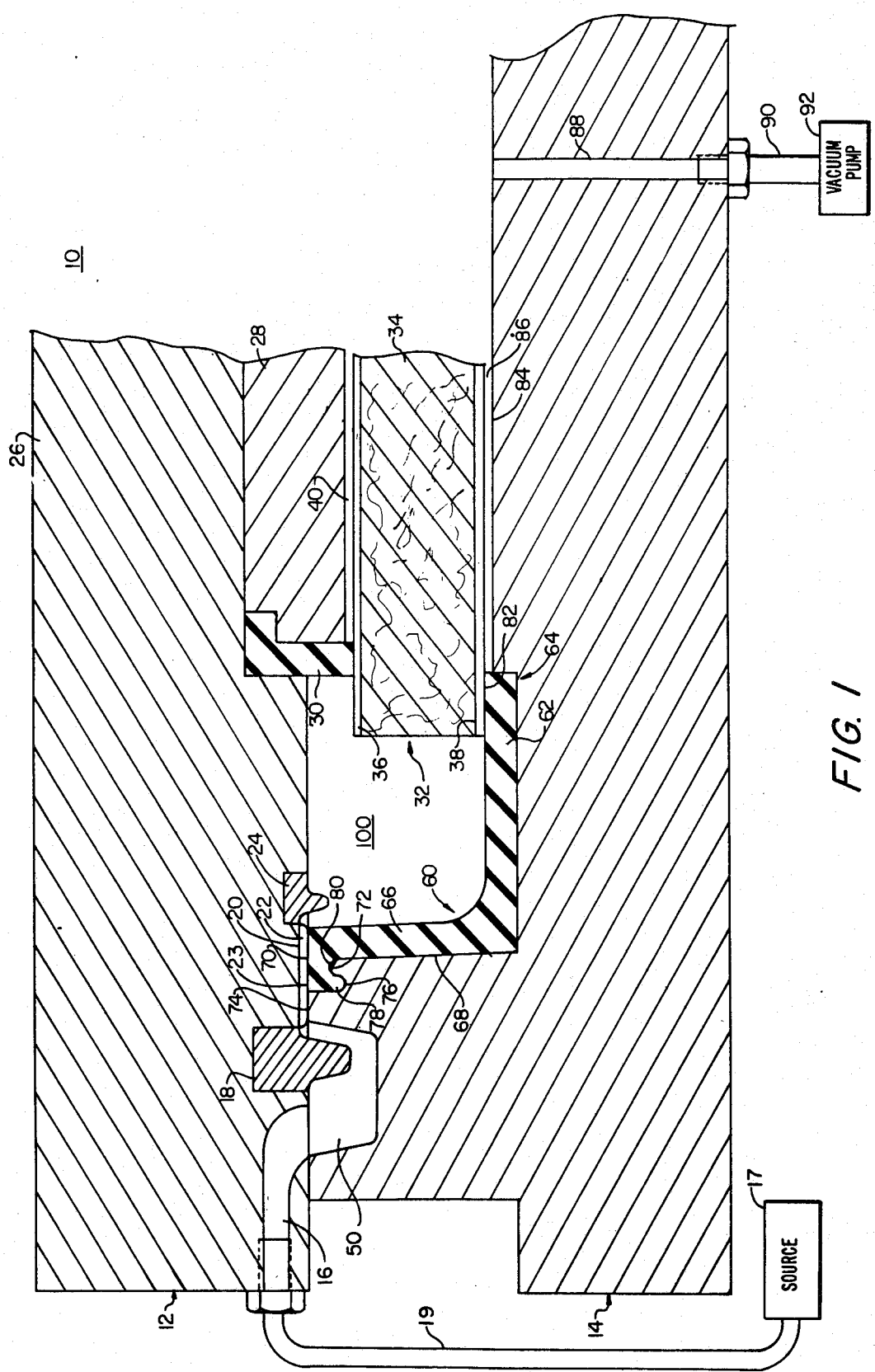
FIG. 1 is a sectional view taken along lines 1—1 of FIGS. 2 and 3 of a portion of the core and cavity of a mold using the finger gate and elastomeric form according to this invention.

The invention may be accomplished with an injection molding system which has a core and a permanent cavity. In accordance with the invention at least a portion of the permanent cavity includes an elastomer. "Permanent cavity" refers to that part of the cavity, including the elastomeric portion, which may be used for repeated injection molding applications. Although the elastomeric portion is typically one integral unit, it is perceived as having three parts: the first part defines at least a portion of the floor of the cavity; the second part defines at least a portion and typically all of the wall of the cavity; and the third part defines the upper edge of the wall and extends outwardly therefrom to define at least a portion of the top of the cavity. There is a finger gate which interconnects the cavity with a source of molding medium. The finger gate includes a plurality of spaced fingers mounted on the core, transverse to the edge of the wall and aligned with the flow of the molding medium into the cavity, for engaging the third part of the elastomeric portion and securing it in the cavity.

Thus when the core is closed upon the cavity the fingers hold the third part, or lip, of the elastomeric portion against the core and prevent it from being disrupted by the inflowing molding medium. The finger gate further serves to damp and control the flow of the incoming molding medium to further reduce danger of unseating or distorting the elastomeric portion of the cavity. In normal molding machines, the finish applied to the molding product is dictated by the finish on the steel surfaces of the mold. These surfaces can be engraved by skilled workers or etched chemically to provide various kinds of textures, but these texturing techniques are expensive and do not often rise to the level of the natural textures which they seek to replicate. However, with this invention the use of a permanent cavity having an elastomeric portion composed of a material such as a urethane elastomer or rubber enables the formation of many different complex natural textures. The elastomeric portion may itself be made by being cast on an original handmade object, such as a wooden piece, so that the natural grains of the wood are formed right in the surface of the elastomeric portion. Thus, parts molded using the elastomeric portion will have the natural grain impressed in them with a minimum of expense and the highest possible accuracy of imitation. The first part of the elastomeric portion may be made to define the entire floor of the cavity or only the periphery of the cavity floor, leaving the interior portion of the floor bare and without an elastomeric portion. In this latter case, an insert such as a formica or wooden plate may be placed in the mold, covering the interior floor of the cavity and sealed against the inner end of the first part of the elastomeric portion. A vacuum may be applied through vacuum holes in the interior floor of the cavity, or in a vacuum plenum provided in the space between the floor and the insert, to hold the insert in place and seal it against the inner end of the first part of the elastomeric portion. The core may contain a gasket which seals against the insert on the core side and a deflector may be used at the mouth of the finger gate to redirect the flow of the molding medium away from the gasket. The increased resilience of the elastomeric cavity surface over the usual steel mold parts enables this molding machine to tolerate normal variances in the dimensions of the inserts which would otherwise be unacceptable to the high precision construction of the mold core and cavity.

Figure 2:
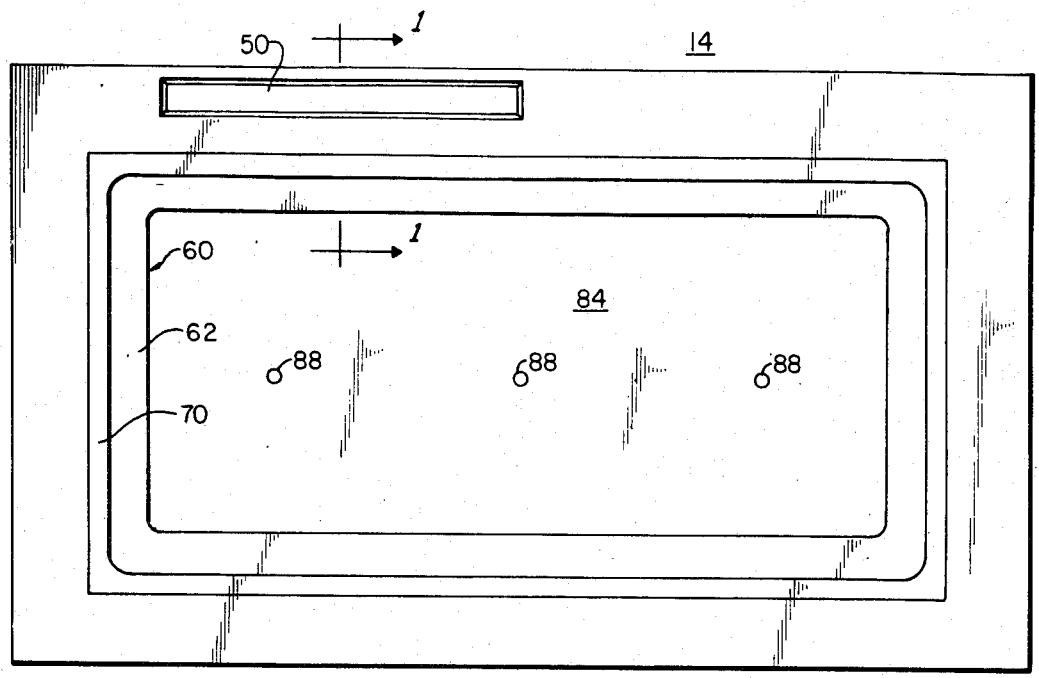
FIG. 2 is a plan view of the cavity of FIG. 1.
Figure 3:
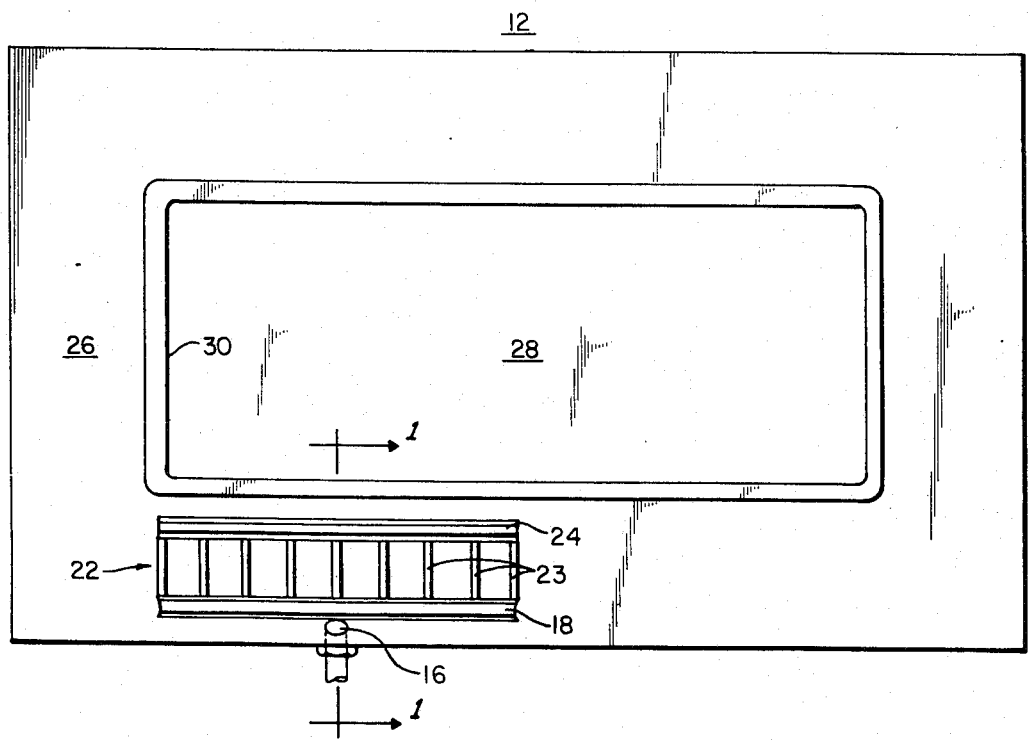
FIG. 3 is a plan view of the core of FIG. 1.

There is shown in FIGS. 1-3 a mold 10 according to this invention in the closed position with core assembly 12 received by cavity assembly 14 having a permanent cavity 64. Core assembly 12 includes an injection channel 16 and an aluminum dam 18. Injection channel 16 is adapted for interconnection with a conventional source 17 of molding medium through a conduit 19. A relieved portion 20 provides for finger gate 22, which includes a plurality of fingers 23, FIG. 3, which extend between dam 18 and aluminum deflector 24. Fingers 23 are raised portions extending downwardly from core assembly 12 toward cavity assembly 14 and which extend transversely along the top of cavity 14 aligned in the direction of flow of the molding medium being fed through finger gate 22. Core assembly 12 is formed of a main plate 26 and a locking plate 28 which locks in place insert gasket 30, which seals against insert 32. Insert 32 may include a honeycomb structure 34 sandwiched between wood or wood product layers 36 and 38. Often, layer 38 is made of formica or other similar material. Insert gasket 30 extends slightly beyond locking plate 28 to leave a small area 40 between locking plate 28 and layer 36 of insert 32.

Cavity assembly 14, FIGS. 1 and 2, includes channel 50 which interconnects injection channel 16 with finger gate 22. The permanent cavity 64 includes an elastomeric portion 60, which has a first part 62 defining a peripheral portion of the floor of the cavity, a second part 66 which rises to define the wall of cavity, a third part 70 which defines the upper edge of the wall and extends outwardly from the wall to define a portion of the top 74 of the cavity, and a typically non-elastomeric (e.g., steel) portion 84 which defines the remaining interior region of the cavity floor. A typically non-elastomeric tongue 72 of cavity 14 ends slightly below top 74. Behind tongue assembly 72 is an undercut or recess 76, which receives conforming protrusion 78 and recess 80 of the third part 70 of portion 60 to form an interlock which prevents the elastomeric portion 60 from being driven away from the remainder of cavity assembly 14 by the action of the inflowing molding medium through finger gate 22.

Being at least a portion of the "permanent cavity" means that the elastomeric portion is not necessarily removed or replaced between successive injection molding operations. The mere completion of a single such operation does not by itself destroy the usefulness or require replacement of portion 60. Rather, when the operation is completed and the molded parts are removed from the cavity, the elastomeric portion may remain as a part of the permanent surface of the cavity assembly 14, thereby serving in the succeeding molding operations. Notwithstanding this, when it is desired to change the type of molded parts or otherwise change the grain or texture of the parts (and thus the mold) the elastomeric portion can be removed and replaced by one having the desired texture or dimensions. This new portion then becomes part of the permanent cavity 64.

Insert 32 rests on the inner end 82 of first part 62 of portion 60, leaving a space between layer 38 and the interior permanent cavity floor portion 84, which forms a vacuum plenum 86. The vacuum in plenum 86, provided through channel 88 and hose 90 from vacuum pump 92, pulls down insert 32 toward the interior portion 84 of cavity 64 so that it seals tightly against the end 82 of elastomeric portion 60.

In operation, the molding medium, typically a reaction composition such as thermoset foam or elastomeric foam system, is fed into injection channel 16 at high pressure. The medium flows from injection channel 16 into recess 50, where it strikes dam 18 and then flows around dam 18 and through finger gate 22. Upon exiting from finger gate 22 it strikes deflector 24 so that it is redirected downwardly and does not impinge directly on seal 30. The fingers 23, carried by core 12 and resting on cavity 14, hold down the third part 70 of portion 60 and ensure that the flow of the medium does not disconnect or dislodge portion 60. In this manner, the molding medium is caused to fill chamber 100, surrounding insert 32 without dislodging or distorting gasket 30 or portion 60.

Figure 4:
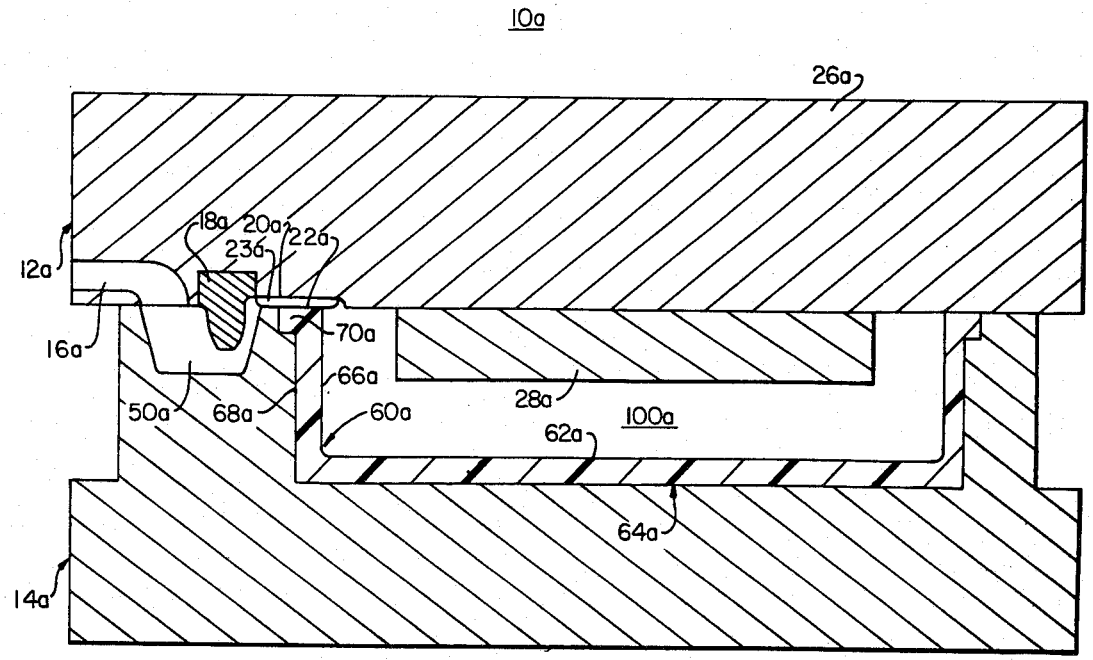
FIG. 4 is a sectional view similar to that shown in FIG. 1 of an alternative construction according to this invention.
Figure 5:
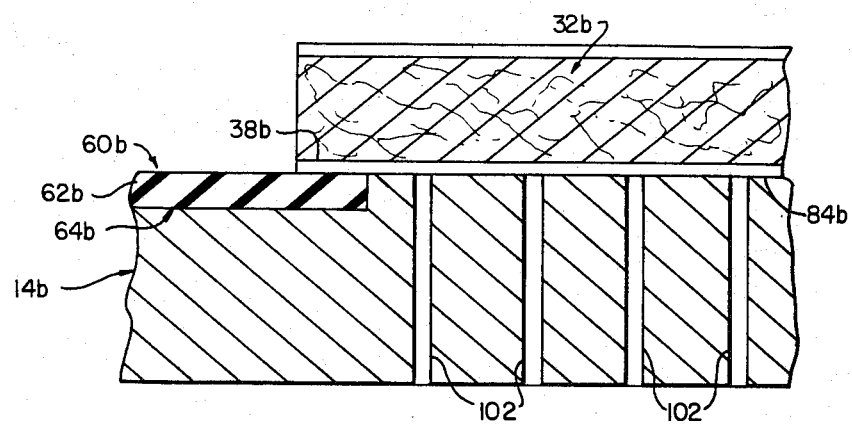
FIG. 5 is a sectional view of a portion of FIG. 1 showing an alternative device for applying vacuum to the insert.

In an alternative embodiment, the injection molding machine 10a, FIG. 4, may be used without insert 32 and thus gasket 30 is not necessary; neither is deflector 22. Cavity assembly 14a defines a permanent cavity 64a. Chamber 100a includes the entire interior area as well as the peripheral area in cavity 64a, and elastomeric portion 60a may define the entire floor 62a of cavity 64a, defining both the peripheral and interior portions of floor 62a. Floor 62a may be of uniform height throughout, as opposed to the floor in FIG. 1, wherein the interior portion 84 is slightly lower than elastomer part 62. In addition, in the absence of an insert 32 the vacuum holding system may be unnecessary. Although in the preferred embodiment the elastomeric portion is interlocked with an undercut in the cavity, this is not a necessary limitation of the invention, for in some applications the third part 70a, FIG. 4, may be constructed in simpler fashion and still provide the necessary security with the cooperation of the fingers 23a of finger gate 22a. Although the vacuum holding power in FIG. 1 is shown to use a vacuum plenum interconnected through holes to a vacuum pump, this is not a necessary limitation of the invention, for as shown in FIG. 5 the vacuum plenum may be eliminated and the interior portion 84b of floor 64b raised closer to the bottom layer 38b of insert 32b so that a plurality of vacuum holes 102 may be used to directly hold down insert 32b. Vacuum holes 102 are connected through a suitable manifold to a vacuum pump as in FIG. 1.

Other embodiments will occur to those skilled in the art and are within the following claims:

What is claimed is:

1. An injection molding machine comprising:
   a core and a permanent cavity at least a portion of which is elastomeric, said elastomeric portion including a first part defining at least a portion of the floor of said cavity, a second part defining at least a portion of the wall of said cavity, and a third part defining at least a portion of the upper edge of the wall and extending outwardly therefrom to form at least a portion of the top of said cavity, the cavity floor having an interior portion which is not elastomeric and said first part of said elastomeric portion defining the periphery of the cavity floor for receiving an insert at its inner end proximate said interior non-elastomeric portion of the cavity floor; and
   a finger gate for interconnecting said cavity with a source of molding medium, said finger gate including a plurality of spaced fingers on said core transverse to the edge of the wall and aligned with the flow of the molding medium into said cavity for engaging said third part of said elastomeric portion and securing said elastomeric portion against said core to prevent disruption of said elastomeric portion as molding medium is introduced to said cavity.

2. An injection molding machine comprising:
   a core and a permanent cavity at least a portion of which is elastomeric, said elastomeric portion including a first part defining at least a portion of the floor of said cavity, a second part defining at least a portion of the wall of said cavity, and a third part defining at least a portion of the upper edge of the wall and extending outwardly therefrom to form at least a portion of the top of said cavity, the cavity floor having an interior portion which is not elastomeric and said first part of said elastomeric portion defining the periphery of the cavity floor for receiving an insert at its inner end proximate said interior non-elastomeric portion of the cavity floor;
   a finger gate for interconnecting said cavity with a source of molding medium, said finger gate including a plurality of spaced fingers on said core transverse to the edge of the wall and aligned with the flow of the molding medium into said cavity for engaging said third part of said elastomeric portion and securing said elastomeric portion against said core to prevent disruption of said elastomeric portion as molding medium is introduced to said cavity; and
   vacuum means for urging said insert in said cavity against said inner end of said first part of said elastomeric portion and toward the interior non-elastomeric portion of said cavity.

3. An injection molding machine comprising:
   a core and a permanent cavity at least a portion of which is elastomeric, said elastomeric portion including a first part defining at least a portion of the floor of said cavity, a second part defining at least a portion of the wall of said cavity, and a third part defining at least a portion of the upper edge of the wall and extending outwardly therefrom to form at least a portion of the top of said cavity; and
   a finger gate for interconnecting said cavity with a source of molding medium, said finger gate including a plurality of spaced fingers on said core transverse to the edge of the wall and aligned with the flow of the molding medium into said cavity for engaging said third part of said elastomeric portion and securing said elastomeric portion against said core to prevent disruption of said elastomeric portion as molding medium is introduced to said cavity.

4. The machine of claim 3 in which said first part of said elastomeric portion defines the entire floor of said cavity.

5. The machine of claim 3 in which the cavity floor has an interior portion which is not elastomeric and said first part of said elastomeric portion defines the periphery of said cavity floor for receiving an insert at its inner end proximate said interior non-elastomeric portion of the cavity floor.

6. The machine of claim 5 in which said core includes an insert gasket for sealing against the surface of the insert.

7. The machine of claim 5 in which said core includes a deflector proximate said finger gate for redirecting the molding medium transmitted through said finger gate.

8. The machine of claim 3 in which said cavity includes an undercut proximate the top of said cavity behind said upper edge of said wall for interlocking with the complementarily shaped said third part of said elastomeric portion.

9. The machine of claim 5 further including vacuum means for urging an insert in said cavity against said inner end of said first part of said elastomeric portion and toward the interior non-elastomeric portion of said cavity.

10. The machine of claim 5 in which said cavity includes an injection channel and said core includes a dam receivable in said channel for redirecting the flow of the molding medium prior to transmission through said finger gate.

11. An injection molding machine comprising:
   a core and a permanent cavity at least a portion of which is elastomeric, said elastomeric portion including a first part defining at least a portion of the floor of said cavity, a second part defining at least a portion of the wall of said cavity, and a third part defining at least a portion of the upper edge of the wall and extending outwardly therefrom to form at least a portion of the top of said cavity, at least said first part having a textural design formed therein; and a finger gate for interconnecting said cavity with a source of molding medium, said finger gate including a plurality of spaced fingers on said core transverse to the edge of the wall and aligned with the flow of the molding medium into the cavity for engaging said third part of said elastomeric portion and securing said elastomeric portion in said cavity against said core to prevent disruption of said elastomeric portion as molding medium is introduced to said cavity.

* * * * *